W. F. RAY.

APPARATUS FOR MANUFACTURING TIRES OR INTERLINERS.

APPLICATION FILED NOV. 28, 1919.

Reissued June 8, 1920. 14,879.

2 SHEETS—SHEET 1.

Inventor:
William F. Ray,
By Dyrenforth, Lee, Christ & Wills,
Attys.

W. F. RAY.

APPARATUS FOR MANUFACTURING TIRES OR INTERLINERS.

APPLICATION FILED NOV. 28, 1919.

Reissued June 8, 1920.

14,879.

2 SHEETS—SHEET 2.

Inventor:
William F. Ray,
By Dyrenforth, Lee, Christton & Miles,
Atty's.

UNITED STATES PATENT OFFICE.

WILLIAM F. RAY, OF CHICAGO, ILLINOIS.

APPARATUS FOR MANUFACTURING TIRES OR INTERLINERS.

14,879. Specification of Reissued Letters Patent. Reissued June 8, 1920.

Original No. 1,292,052, dated January 21, 1919, Serial No. 257,453, filed October 9, 1918. Application for reissue filed November 28, 1919. Serial No. 341,313.

*To all whom it may concern:*

Be it known that I, WILLIAM F. RAY, a citizen of the United States, residing at Chicago, in the county of Cook and State of Illinois, have invented a new and useful Improvement in Apparatus for Manufacturing Tires or Interliners, of which the following is a specification.

This invention relates particularly to apparatus for use in the manufacture of a puncture-proof inner casing or interliner, or puncture-proof tire; and the invention is well adapted to use in the manufacture of a tire, or interliner, of the character described in my Patent No. 1,251,576, granted January 1st, 1918.

The primary object is to provide a simple and cheap device or apparatus which is adapted for use in the economical manufacture of a tire, or interliner, of the character mentioned.

The invention is illustrated, in the preferred embodiment in the accompanying drawings, in which—

Figure 1:
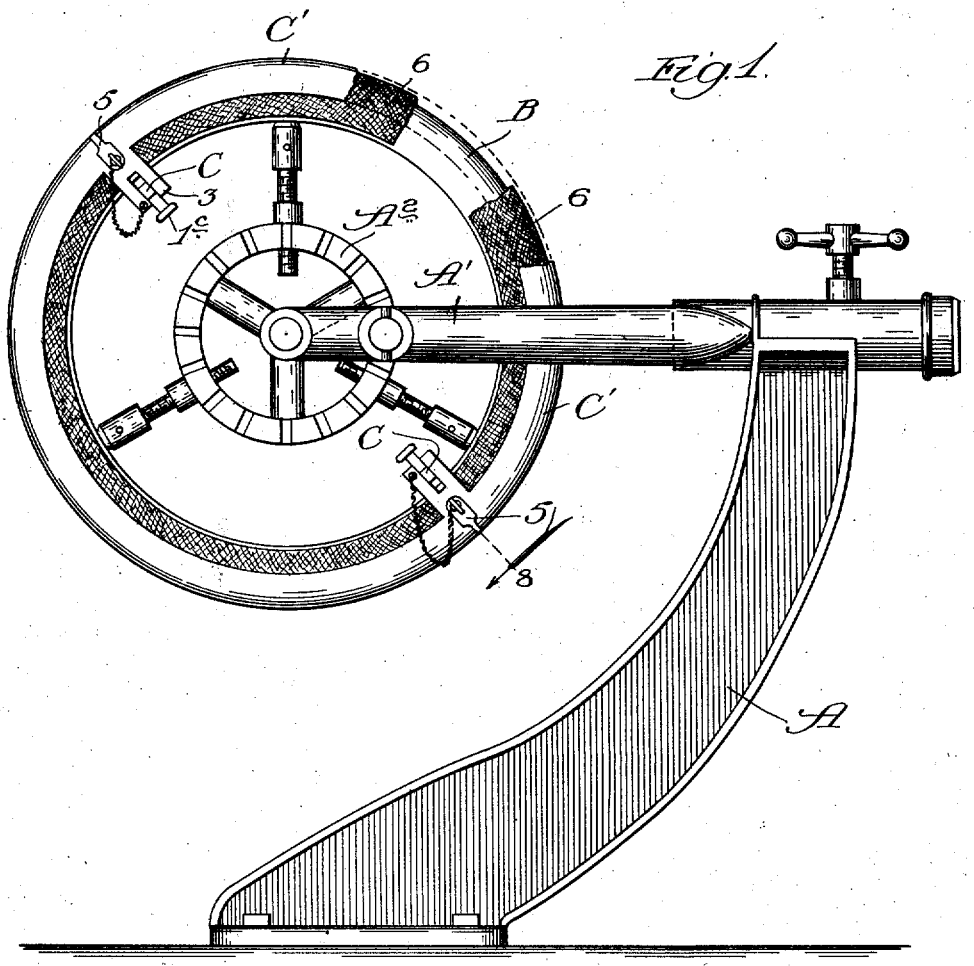
Figure 2:
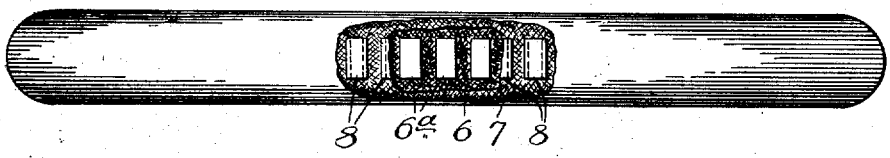
Figure 3:
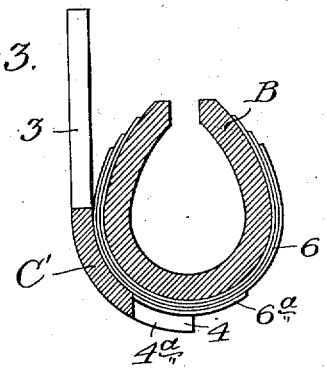
Figure 5:
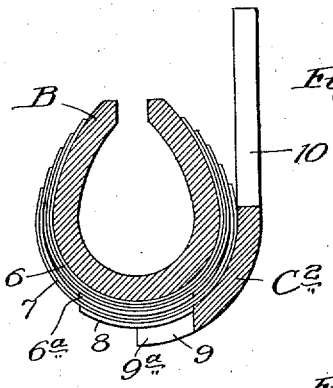
Figure 4:
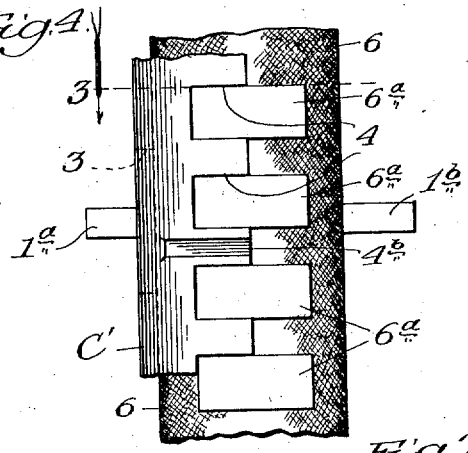
Figure 6:
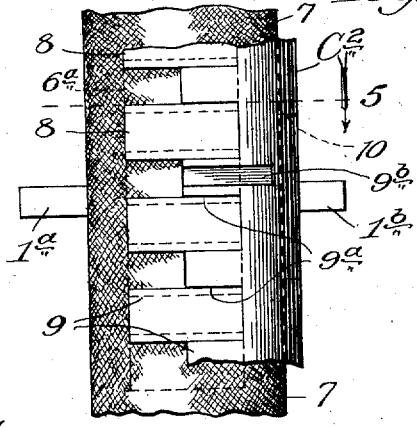
Figure 7:
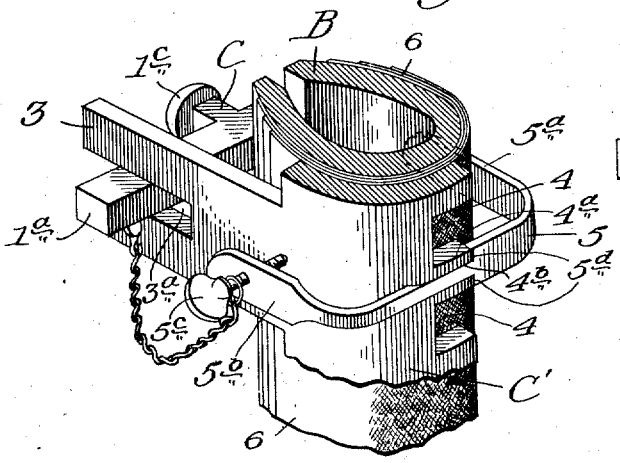

Figure 1 represents an elevational view of the improved apparatus, the view showing certain parts brokenly; Fig. 2, a broken plan view of a tire, or interliner, for use in the manufacture of which the improved apparatus is particularly useful; Fig. 3, a sectional view of the annular mandrel of the device and the templet which is employed for spacing the inner series of steel strips which enter into the construction of the interliner, or tire, the section being taken as indicated at line 3 of Fig. 4; Fig. 4, a broken plan view illustrating the carcass in process of construction; Fig. 5, a section similar to Fig. 3, but showing the templet employed for spacing the steel strips of the outer series; Fig. 6, a broken plan view similar to Fig. 4, but illustrating the spacing of the steel strips of the outer series; Fig. 7, a broken perspective view illustrating the manner in which the templet in use is mounted; and Fig. 8, a sectional view taken as indicated at line 8 of Fig. 1, and showing one of the templet-supports, carried by the core, it being remarked that Fig. 1 shows two of these templet-supports, each one of which is adapted to support either one of the two templets which are used during the course of the manufacture of the tire or interliner structure.

In the form of the device illustrated, A represents a standard equipped with an arm $A^1$ upon which is mounted a rotatable spider $A^2$; B, an annular core or mandrel mounted on the spider $A^2$; C, a pair of templet-supports carried by the mandrel; and $C^1$ and $C^2$, a pair of annular templets, one of which is used in placing the steel strips of the inner series and the other of which is used in placing the steel trips of the outer series.

The frame, or mounting, A, may be of any suitable construction. The form illustrated is well adapted to support the mandrel and permit it to be turned as may be necessary in the operation of building up the tire structure.

The mandrel B may be constructed in any desired manner. In the illustration given, the mandrel comprises a hollow metal annulus.

Figure 8:
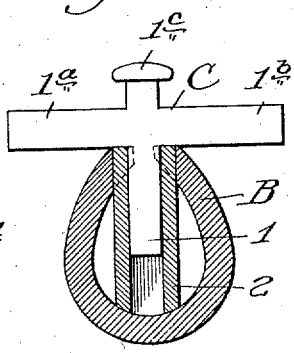

The templet-supports C, of which there are two, are detachably mounted in the inner periphery of the annular mandrel in the manner illustrated in Fig. 8. Each support C comprises a post 1 equipped with cross-arms $1^a$ and $1^b$, each of which is adapted to serve as one of the supports for an annular templet. The post 1 is of square cross-section and fits snugly in a radial socket 2 which is firmly secured in the mandrel, the socket being open at its inner end to permit insertion or withdrawal of the post 1. The post 1 is held securely in place by frictional contact with the socket. The member C is provided with a knob, or handle, $1^c$, to facilitate the insertion or withdrawal of the post.

The templet $C^1$ comprises a metal annulus of concavo-convex cross-section, approximately a quarter of a circle as shown in Fig. 7. This member is provided with a pair of diametrically opposite guide arms 3, each provided with a guide slot $3^a$ adapted to engage the arm $1^a$ of the corresponding templet-support C. The curved templet $C^1$ is adapted to embrace one side of the mandrel B and has one edge portion which encircles the outer circumference of the mandrel B. This edge portion is provided with a circumferential series of transverse recesses, or slots 4, adapted to receive the inner series of steel strips which form a portion of the armor of the interliner, or tire, structure. The recesses 4 are equi-distant from each other, and thus the templet is provided with teeth or projections $4^a$. At points corresponding with the guide-arms 3, two of the teeth are provided with slots $4^b$ adapted to receive the narrowed portions of the webs of a pair of clamps 5 which are employed to clamp the templet to the form. The clamp 5 has an arm $5^a$ adapted to engage one side of the form and an arm $5^b$ which is equipped with a set-screw $5^c$ adapted to engage the other side of the templet. The web portion of the member 5 is provided with shoulders $5^d$ adapted to engage the end of the slotted tooth $4^a$, thus providing stops which insure the accurate positioning of the templet with relation to the form.

In Fig. 7, the "carcass" of the interliner is shown as composed of a number of layers of fabric 6. These layers are impregnated with rubber cement in the usual manner and, in practice, the outer layer of fabric is sufficiently sticky to engage and hold the curved steel strips when they are placed in the spaces 4 and pressed against the fabric. Fig. 3 represents a sectional view corresponding with Fig. 7, and shows one of the steel strips $6^a$ in position. Fig. 4 shows a series of the steel strips $6^a$ in position.

It will be understood that the templet $C^1$ is mounted on the mandrel in the manner illustrated in Fig. 1 and is employed during the operation of placing the inner series of steel strips $6^a$. The templet $C^1$ is then removed, and additional layers of fabric are applied, so that the series of strips $6^a$ are covered, these additional layers of fabric being indicated by the numeral 7 in Fig. 5. The templet $C^2$, which has a slightly larger arc than the templet $C^1$ is then applied, and an outer series of curved steel strips 8 are placed in position.

The templet $C^2$ is provided with a series of transverse slots, or recesses, 9, adapted to permit the steel strips 8 to be placed in position as will be understood from Figs. 5 and 6. Thus, the templet $C^2$ has a series of spaced teeth $9^a$; and at diametrically opposite points two of these teeth are provided with slots $9^b$ adapted to receive the reduced portions of the webs of the clamps $5^b$, which may be reversed when used in connection with the templet $C^2$. The spaces 9 of the templet $C^2$ are staggered with relation to the spaces 4 of the templet $C^1$, as will be understood from Figs. 4 and 6, the purpose being to enable the steel strips 8 to be so placed as to overlap the steel strips $6^a$ of the inner series. The templet $C^2$ is provided with a pair of diametrically opposite arms 10 which are slotted in the same manner as are the arms 3 of the templet $C^1$, so as to engage the socket arms $1^b$ of the templet-supports C. These guides 10 are so positioned on the templet $C^2$ as to cause the slots 9 of the templet to be staggered with relation to the position of the inner steel strips $6^a$. This is important for the reason that the inner series of strips are covered by the fabric 7, and without this precaution, there would be no way of determining the proper position for the templet $C^2$.

After the steel strips 8 of the outer series have been placed in position and pressed against the fabric 7 to which they adhere, the templet $C^2$ is removed and additional layers of fabric are applied, after which the form is removed from the spider and introduced into the vulcanizer in the usual manner.

The apparatus described is simple and enables an interliner or tire structure of the character mentioned to be constructed rapidly and in an economical manner. It is preferred to mount the templet-supports C directly upon the inner peripheral portion of the mandrel B; and as it is necessary, in common practice, to employ many mandrels in the manufacture of each size of interliner or tire, it is convenient to form the templet-supports C separately and then insert them in sockets with which the mandrel is provided, in the manner illustrated in Fig. 8.

While the members C have been described as templet-supports and in one sense are supports, it should be noted that their chief function is to serve as guides or positioning members for the templets. Thus, the arms $1^a$ of the members C are freely entered in the slots $3^a$ of the arms 3 of the templets and position the templets, but do not engage the bottoms of said slots. Each templet, however, has a cross-sectional curvature which causes it to overlie and embrace the tread-portion of the form in a substantial manner, so that the form will substantially support the templet; and, if desired, the templet may be bound to the form, as by means of the clamps 5, as illustrated.

The foregoing detailed description has been given for clearness of understanding only, and not unnecessary limitations should be understood therefrom, but the appended claims should be construed as broadly as permissible, in view of the prior art.

What I regard as new and desire to secure by Letters Patent is:

1. In means of the character set forth, the combination of an annular mandrel, a templet-positioning device, and an annular templet engaging said positioning device and co-acting with said mandrel, said templet being provided circumferentially with a series of recesses.

2. In means of the character set forth, the combination of an annular mandrel, a plurality of supports, and a pair of templets adapted to be positioned by said supports, said templets being provided circumferentially with series of recesses, the recesses of one templet being staggered with relation to the recesses of the other templet.

3. In means of the character set forth, the combination of an annular mandrel, a plurality of supports, a pair of annular templets adapted to co-act with said mandrel, said templets having positioning arms so disposed as to engage said supports and having series of annular recesses, the series of recesses of one templet being staggered with relation to the series of recesses of the other templet.

4. In means of the character set forth, the combination of an annular mandrel, a plurality of posts extending inwardly from said mandrel and equipped with cross-arms, and a pair of templets adapted to co-act with said mandrel, said templets having series of circumferential recesses which are staggered with relation to each other and having arms adapted to engage the arms of said posts.

5. In means of the character set forth, the combination of an annular mandrel having a plurality of radial sockets, a plurality of posts removably mounted in said sockets, each post having a pair of laterally projecting arms, and a pair of templets provided with circumferential series of recesses which are staggered with relation to each other and provided with arms having guide slots adapted to engage the arms of said posts.

6. In means of the character set forth, the combination of an annular mandrel, a plurality of supports, an annular templet positioned by said supports and co-acting with said mandrel, said templet being provided circumferentially with a series of recesses, and clamping devices adapted to secure said templet to said mandrel.

7. In means of the character set forth, the combination of an annular mandrel, a plurality of supports, an annular templet positioned by said supports and co-acting with said mandrel, said templet being provided circumferentially with a series of recesses, and clamping devices adapted to secure said templet to said mandrel, said clamping devices having shoulders adapted to engage the templet and properly position the same with relation to the mandrel.

8. In means of the character set forth, the combination with an annular mandrel, of an annular templet having a concave surface embracing one side and the outer circumferential portion of said mandrel, said templet having laterally open recesses in the edge-portion which encircles the outer circumferential portion of said mandrel.

9. In means of the character set forth, the combination with an annular mandrel, of a pair of annular templets, each having a concave surface adapted to embrace one side and the outer circumferential portion of said mandrel and having laterally open recesses in the edge portion which encircles the outer circumferential portion of said mandrel, the arc of curvature of one of said templets being larger than that of the other templet.

10. In means of the character set forth, the combination with an annular mandrel, of a removable annular templet conforming to said mandrel and provided with an annular series of recess adapted to receive armor strips and position the same upon a carcass on said mandrel.

WILLIAM F. RAY.